United States Patent [19]

Goddard

[11] Patent Number: 4,785,228
[45] Date of Patent: Nov. 15, 1988

[54] ELECTRICAL ENERGY ENHANCEMENT APPARATUS

[76] Inventor: Sydney L. Goddard, 1034 N. Broadway, Haverhill, Mass. 01830

[21] Appl. No.: 10,687

[22] Filed: Feb. 4, 1987

[51] Int. Cl.⁴ .......................................... H02P 11/00
[52] U.S. Cl. ...................................... 322/29; 322/96; 318/303; 310/105; 310/152
[58] Field of Search .................................. 322/29–32, 322/96; 310/74, 105, 152–157; 318/303

[56] References Cited

U.S. PATENT DOCUMENTS

| | | | |
|---|---|---|---|
| 2,892,144 | 6/1959 | Kober | 322/49 |
| 3,064,149 | 11/1962 | Baermann | 310/105 X |
| 3,121,838 | 2/1964 | Mozic | 322/96 X |
| 3,313,993 | 4/1967 | Rupp | 310/156 X |

FOREIGN PATENT DOCUMENTS 0548771 10/1942 United Kingdom ................ 318/303

Primary Examiner—Patrick R. Salce
Assistant Examiner—Anita M. Ault
Attorney, Agent, or Firm—Pearson & Pearson

[57] ABSTRACT

A plurality of permanent magnets mounted at equally spaced angular intervals on a drive shaft are rotated past a plurality of electromagnets at equally spaced fixed angular intervals about the axis of the shaft on a plate supported by a frame. An electric motor drives the drive shaft. The electromagnets are connected across each its own capacitance. At the appropriate speed of rotation the frequency of electrical energy generated by the permanent magnets as they pass the electromagnets causes resonance to occur. This action controls the drive shaft speed. A plurality of capacitors is attached to the base plate and the cross bars of the frame supporting the plate.

1 Claim, 3 Drawing Sheets

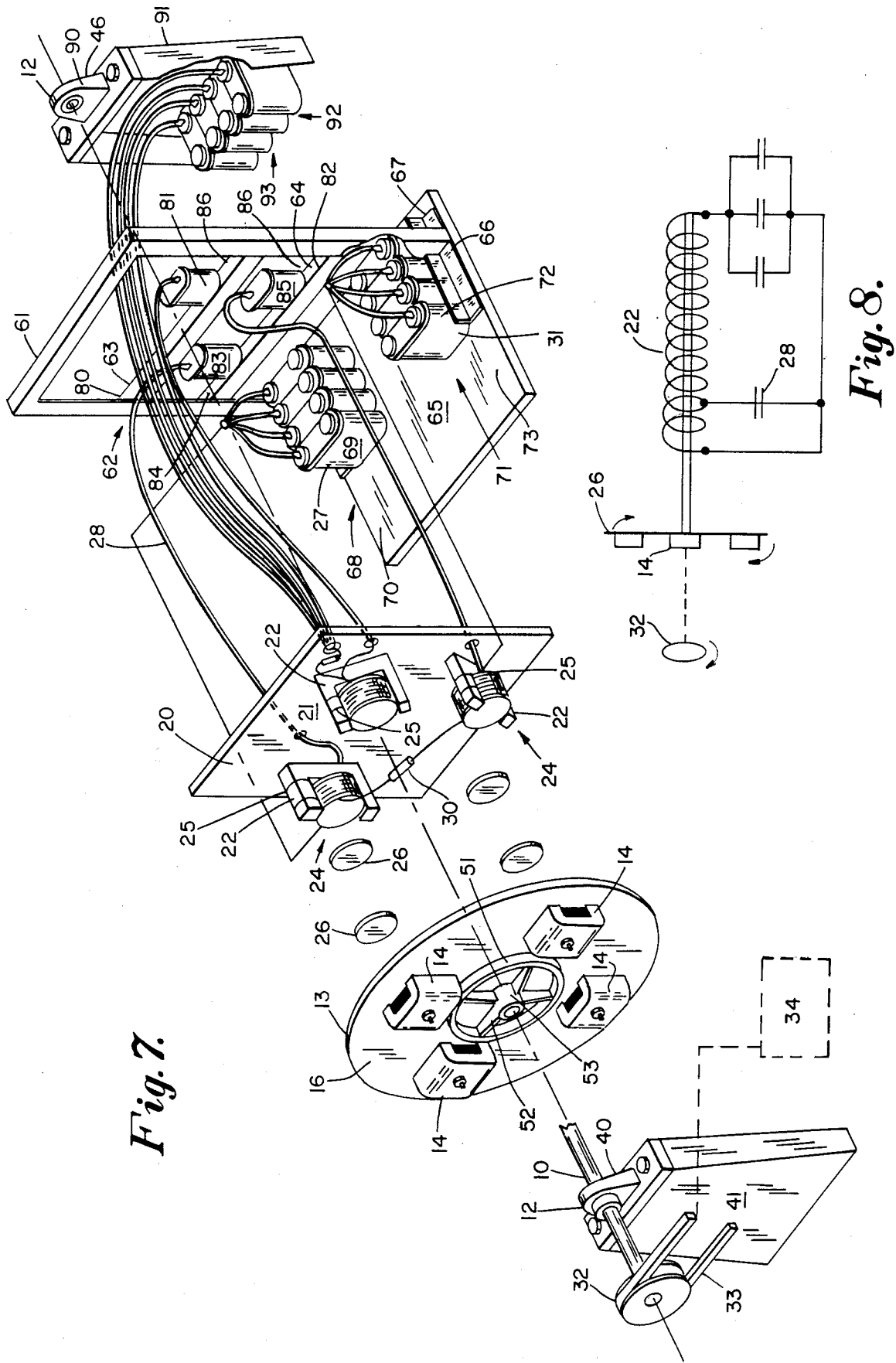

ELECTRICAL ENERGY ENHANCEMENT APPARATUS

FIELD OF THE INVENTION

The invention relates to electrical energy generators more particularly to electrical energy systems in which the generator speed is controlled.

BACKGROUND OF THE INVENTION

U.S. Pat. No. 2,587,648 to Pestarini, Mar. 4, 1952 for "Electrical Power System" discloses a generator for producing electrical power output or for providing rotary motion. A central shaft supported on bearings carries a flywheel and a gyroscope for storing energy. A drive means applies torque to the shaft to cause rotation. Another coil mounted on the shaft cooperates with opposed magnets to provide an electrical power output to an external load.

U.S. Pat. No. 4,223,240 to Theyse, Sept. 16, 1980, for "Flywheel Set for Accumulating Kinetic Energy of Rotation" describes a flywheel with elastically supported bearings resulting in a low critical speed at all times under the operational flywheel speed. Spherical pivot bearings may be fitted both at bottom and top of the rotor.

U.S. Pat. No. 4,446,418 to Richardson May 1, 1984 for "Generator and Drive System" describes a generator system for producing either electrical power output or rotary motion drive. The system includes a central shaft supported on bearings, which carries a flywheel and a vibratory gyroscope for storing energy. A drive means applies torque to the shaft to cause it and the flywheel to rotate. A further coil mounted on the shaft cooperates with opposed magnets to provide an electrical power output to an external load, or a mechanical power output may be taken from the shaft.

SUMMARY OF THE INVENTION

According to the invention, a non-magnetic disc is mounted on a shaft and the disc carries a plurality of permanent magnets. A plurality of electromagnets are arranged so that as the disc rotates on the shaft the permanent magnets are carried successively at equal angular intervals past the magnetic fields of the electromagnets. The electromagnets are connected in circuit respectively with capacitors which tune the electromagnets at the frequency of passage of the various permanent magnets, so that the frequency of each electromagnet capacitor circuit is tuned with a consequent saving of electrical energy with the capacitance to which it is connected. The electromagnets as a result of the resonance feed back energy to assist in driving the shaft. The plurality of capacitors are attached to the base plate and the cross bars of the frame which support the plate. The rear additional capacitors are located in the rear housing.

DESCRIPTION OF THE DRAWING

The various objects, advantages, and novel features of the invention will be more fully apparent from the following detailed description when read in connection with the accompanying drawing, in which the like reference numerals refer to like parts and in which:

FIG. 7 is an exploded view of the arrangement of FIG. 1 also in perspective but changed from left to right;
FIG. 8 is a schematic diagram helpful in explaining the invention.

DESCRIPTION OF A PREFERRED EMBODIMENT

Figure 1:
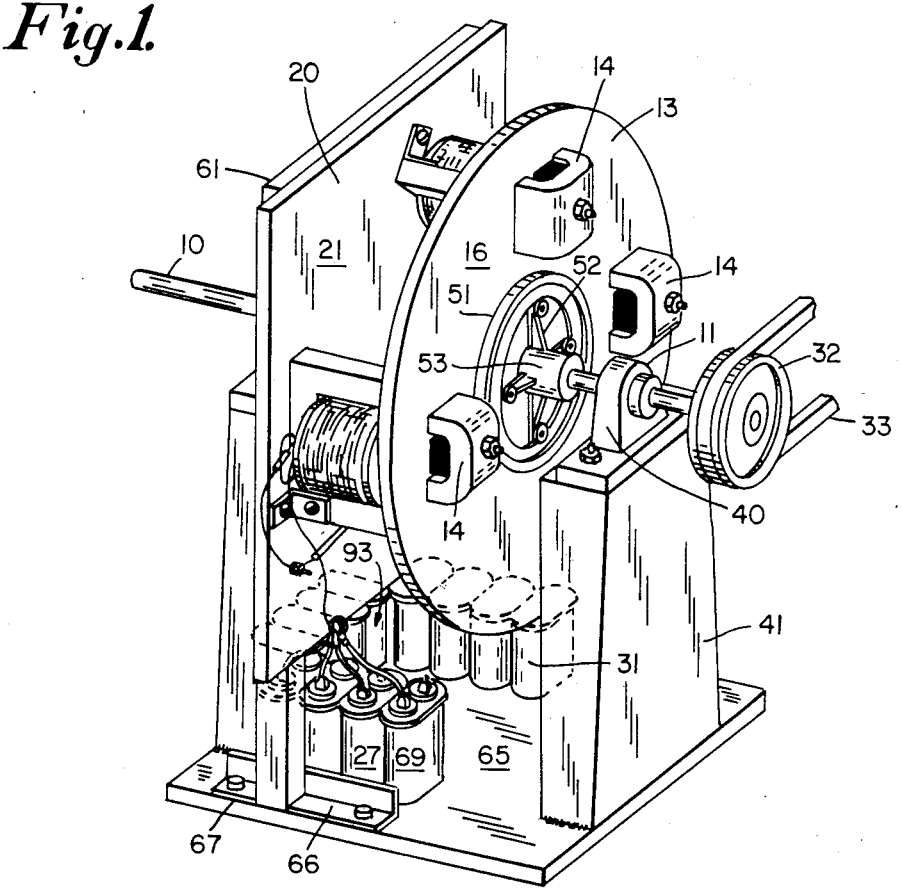
FIG. 1 is a perspective view of a portion of an embodiment of the invention illustrating the disc and electromagnet mountings.
Figure 2:
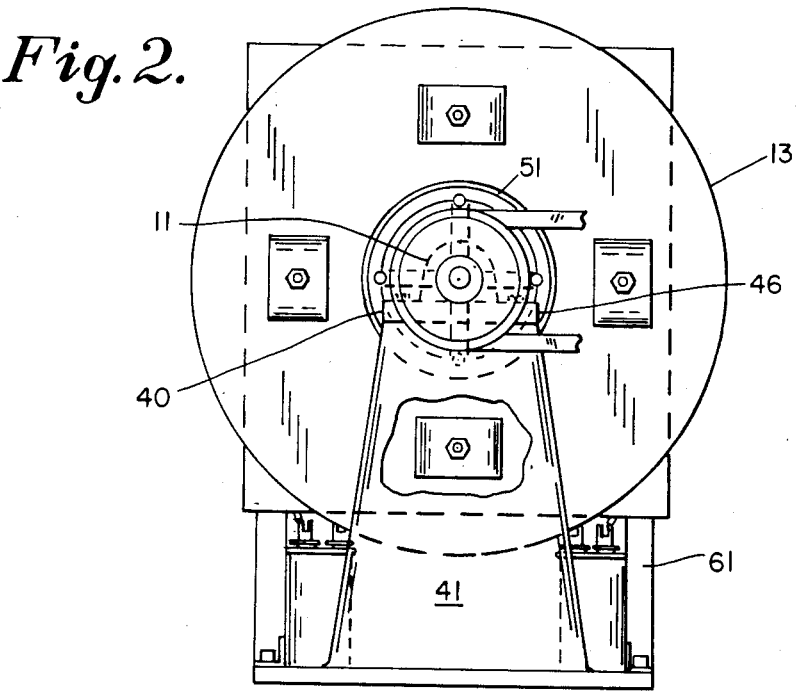
FIG. 2 is a front view of the portion of FIG. 1.
Figure 3:
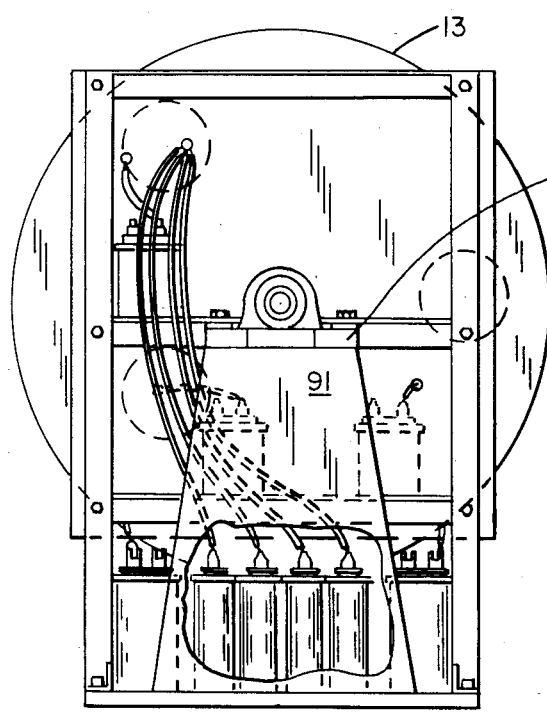
FIG. 3 is a rear view of FIG. 2.
Figure 4:
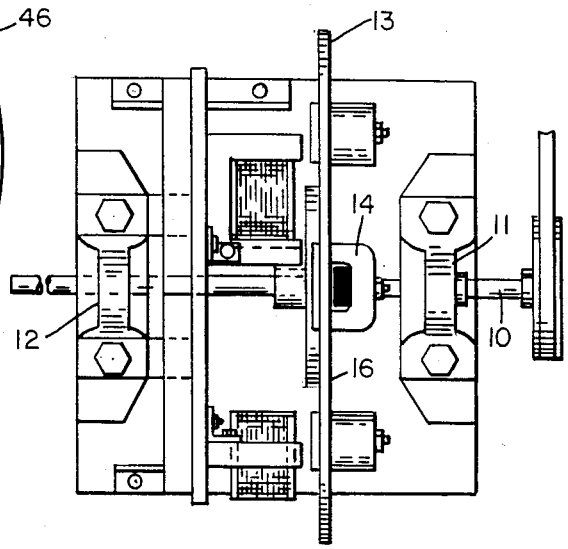
FIG. 4 is a top view of the portion of FIG. 1.
Figure 5:
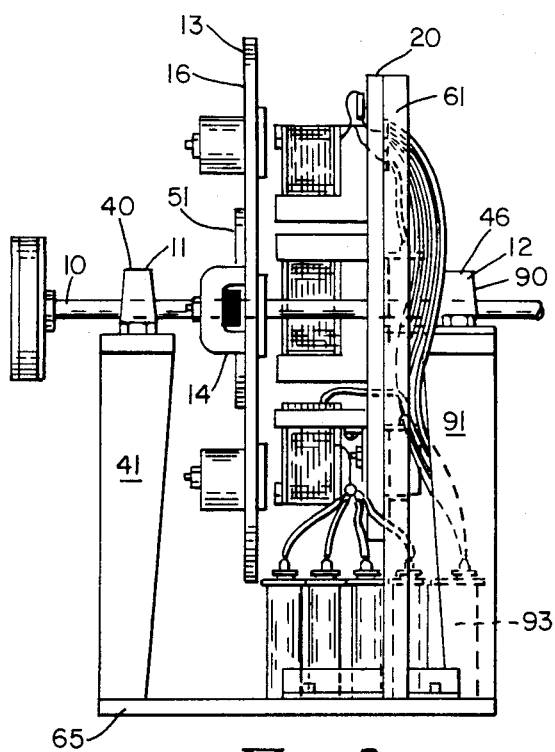
FIG. 5 is a side view of the portion of FIG. 1.
Figure 6:
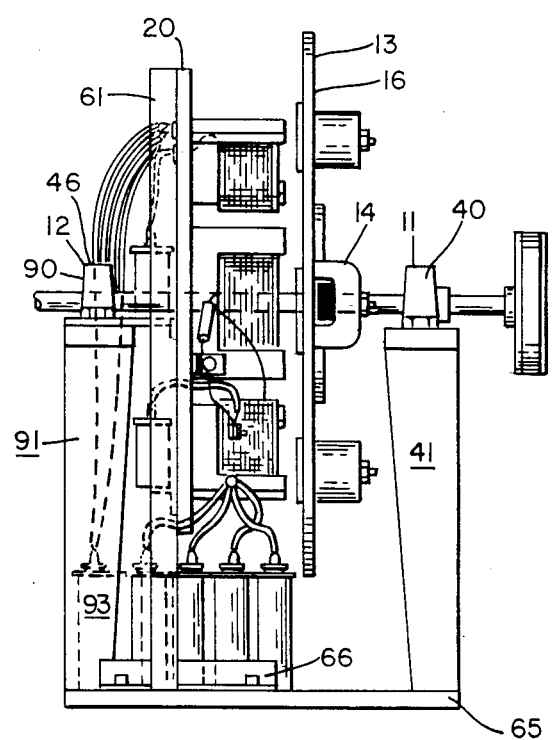
FIG. 6 is the opposite side view similar to that of FIG. 5, illustrating in better detail some of the wiring connections.

Referring to the drawings, a shaft 10 is mounted for rotation between front and rear bearings 11 and 12 respectively. The front bearing 11 is supported in a housing 40 which is supported by an upstanding member 41. The rear bearing 12 is supported in a housing 46 which is supported by an upstanding member 91. A non-magnetic disc 13, which may be aluminum, but is preferably plastic or the like, is fastened to the shaft 10 for rotation with the shaft. The disc 13 carries four permanent magnetic pole pieces 14 in contact with the front face 16 of the disc 13. The front face 16 of the disc 13 has a supporting rim 51 with support arms 52 operably attached to rotating member 53. A fixed plate 20 and a frame 61 are mounted on a base plate 65. The frame 61 has a plurality 62 of cross bars 63 and 64, as best seen in FIG. 7. The frame 61 is supported by back stops 66 and 67. * see page 6A.

*The upper cross bar 80 has an upper capacitor 81 thereon, and the lower cross bar 82 has at least one capacitor 83 on one side 84 of the bar, and at least one capacitor 85 on the opposite side 86 of the bar 80.

Plate 20 carries on its front face 21 three pole pieces 22 of electromagnets 24. The windings 25 of the pole pieces 22 of the electromagnets 24 are about laminations 26 which reduce losses due to undesired or stray currents. The base plate 65 supports a plurality 68 of capacitors 27 and specifically a first set 69 on one side 70 of the plate 65, and a plurality 71 of capacitors 31 and a second set 72 of capacitors on the other opposite side 73 of the plate 65.

The windings 25 are connected by paired conductors 28 which connect the capacitors across the windings 25, one set of parallel connected capacitors to each winding 25, so that effectively the inductor formed by the winding 25 is connected in series with the capacity which results from the parallel connected set of capacitors, each set forming effectively a single capacitor with its correspondingly connected winding 25.

The connection of the windings to the multiple capacitors 31 and 69 are indicated as only a single line, they may be a plurality of lines as shown in the connection with capacitors 93 in FIG. 7, the two showings being electrically equivalent. Whether the common connection is made to the multiple capacitors at a point near the winding, or a point near the capacitors is electrically equivalent, except for the differences of stray capacitances or the like.

As shown schematically in FIG. 8, the pole pieces come periodically into alignment with the windings and coils. As each coil, for example coil 22, comes into alignment with its corresponding permanent magnet 14, it induces a voltage in the windings.

Each winding 22 is split so that one portion acts as a low voltage, high current primary winding of an autotransformer, that being the part in parallel for example with the capacitor 81, and the other part of the coil 22 is in parallel with the greater capacity of the set of capacitors 93 and acts as a high voltage, low capacity winding of the same transformer. At a certain frequency of recurrence of the passage of the permanent magnet pole pieces, the windings or coil 22 will be in resonance with the respective capacitances with which they are parallel connected.

The rear bearing 12 has a housing 90 which is supported by an upstanding member 91 which is connected to base plate 65. Attached to the base plate and adjacent to the upstanding member 91, there is a plurality of capacitors 92 comprising a rear set 93 of capacitors which are connected to electromagnets 24.

The shaft 10 also carries pulley 32 on which is a belt 33. The belt 33 is connected to be driven by an electric motor 34.

When the electric motor, which may be a series wound motor, and may be operated on A.C. or D.C. current, is actuated, the permanent magnet pole pieces 14 are driven successively past the electromagnetic pole pieces 22, at a frequency determined by the speed with which the motor 34 drives the belt 33. At a certain speed the frequency with which the pole pieces 14 are driven past the pole pieces 22, if the capacitor values and the inductor values are appropriately selected, will approach or reach the resonant frequency of the inductance and capacitance resulting from the electromagnets 24 and the capacitors. Because of the assistance and placement of capacitors 83, 85, 81, and rear back-up capacitors 92, the disc 13 speed is controlled. Of course, the pole pieces 14, and the pole pieces 22, are carried past each other as closely as possible, and the disc 13 is accordingly chosen to have a reduced or minimal axial thickness consistent with the physical load it carries, and to reduce or avoid vibration.

I claim:

1. An apparatus for an electrical generator comprising:
    a drive shaft being supported by at least two upstanding members, the shaft having an axis,
    a non-magnetic disc carried by the shaft;
    a plurality of permanent magnets having pole pieces carried by the disc all at the same radial distance and at regular angular intervals about the shaft axis;
    a plurality of electromagnets mounted to a plate and having windings and having pole pieces fixed each at the same radial distance from the shaft axis as the distance of the permanent magnets from the shaft axis, and at regular angular intervals, the pole pieces of the electromagnets and the pole pieces of the permanent magnets being spaced relative to each other so that the permanent magnet pole pieces are carried by the disc past the electromagnet pole pieces as the disc rotates at equal angular distance intervals and closely to the successively passed electromagnets;
    a plurality of sets of capacitors corresponding in number to the electromagnets, the capacitors of each set being connected in parallel to each other and connected across the windings of a corresponding electromagnet; and
    an electric motor coupled to the shaft to drive the shaft, each electromagnet having the same inductance, and each set of parallel connected capacitors having the same capacitance,
    whereby when the shaft is driven at a certain speed the permanent magnets induce in the electromagnets voltages of a frequency that causes the inductances and the capacitances to resonate;
    said plate with the electromagnets mounted thereon being attached to a frame having cross bars wherein said frame is supported by a base plate and a plurality of back stops,
    a first set of said sets of capacitors being attached to one side of the plate; a second set of said sets of capacitors attached to the opposite side of the plate; and
    a third set of said capacitors comprising an upper capacitor attached to an upper cross bar of said frame, a capacitor attached to one side of the lower cross bar, a capacitor attached to the opposite side of the lower cross bar, and a capacitor positioned in a housing at the rear of the apparatus.

* * * * *